| United States Patent [19] | [11] | 4,146,401 |
|---|---|---|
| Yamada et al. | [45] | Mar. 27, 1979 |

[54] GRAPHITE MATERIAL HAVING COMPRESSIBILITY AND RECOVERING PROPERTY AND METHOD FOR MANUFACTURING THE SAME

[75] Inventors: Kazuo Yamada; Yasuo Nakano; Yoshikatsu Fujii, all of Hitachi, Japan

[73] Assignee: Hitachi Chemical Company, Ltd., Japan

[21] Appl. No.: 709,708

[22] Filed: Jul. 29, 1976

[30] Foreign Application Priority Data

Aug. 2, 1975 [JP] Japan .................................. 50-94621
Dec. 17, 1975 [JP] Japan ................................ 50-151139

[51] Int. Cl.$^2$ ............................................. C04B 35/52
[52] U.S. Cl. ....................................... 106/56; 264/42; 264/63; 264/105; 264/109; 264/319; 423/448; 423/460
[58] Field of Search ...................... 106/56; 264/63, 42, 264/332, 109, 319, 105; 423/448, 460

[56] References Cited

U.S. PATENT DOCUMENTS

| 1,137,373 | 4/1915 | Aylsworth | 264/63 |
|---|---|---|---|
| 3,112,208 | 11/1963 | Johnson | 106/56 |
| 3,404,061 | 10/1968 | Shane et al. | 264/63 |
| 3,627,551 | 12/1971 | Olstowski | 106/56 |
| 3,649,313 | 3/1972 | Fisher | 106/56 |

FOREIGN PATENT DOCUMENTS 66804 1/1893 Fed. Rep. of Germany.

*Primary Examiner*—Robert F. White
*Assistant Examiner*—John Parrish
*Attorney, Agent, or Firm*—Craig & Antonelli

[57] ABSTRACT

Acid-treated and water-washed graphite particles are further treated with an aqueous solution of a phosphoric acid or a salt thereof, the expanded by heating to 20 to 70 times (in terms of bulk density ratio) the original graphite particles and the expanded particles are pressure-molded to obtain a graphite material having compressibility and recovering property and suitable for use in making those gaskets, packings, heat insulators, and cushion elements which are resistant to oxidation and serviceable at high temperatures.

12 Claims, No Drawings

GRAPHITE MATERIAL HAVING COMPRESSIBILITY AND RECOVERING PROPERTY AND METHOD FOR MANUFACTURING THE SAME

This invention relates to a graphite material having compressibility and recovering property for use in making gaskets, packings, heat insulators, cushion elements, and the like, which are resistant to oxidation and serviceable at high temperatures, and also relates to a process for manufacturing the same.

Graphite is a material excellent in heat resistance, cold resistance, resistance to chemicals, lubricating properties, electrical characteristics, etc., while, on the other hand, it is poor and is brittle. It has another disadvantage of being subject to oxidative deterioration in performance under an oxidizing atmosphere at temperatures higher than 500° C. so that it has been considered unsuitable as a material, for example, for gaskets or the like to be used in leakage prevention.

This invention relates to a graphite material retaining the above-noted advantageous characteristics of the graphite and, in addition, excellent as well as in resistance to high temperature oxidation; the invention also relates to a method for manufacturing such a graphite material.

It is well known that a light-weight, expanded material having a vermiform appearance is obtained by intercalating a blowing agent between basal planes of the carbon network of the acid-treated graphite particles and rapidly heating the particles to expand them in the direction of c axis of the graphite structure.

As disclosed in German patent specification No. 66,804, such a vermiform graphite is known quite easily moldable by compression and molded articles in the form of plate or rod are obtained by compressing the vermiform graphite alone or in admixture with other substances. U.S. Pat. No. 1,137,373 disclosed a compression molding method which employs suitable organic binders such as synthetic resins, for examples, phenolic resins or cellulose acetate. Further, U.S. Pat. No. 3,404,061 disclosed a flexible graphite material of expanded particles compressed together in the absence of a binder, the expanded graphite particles having a c direction dimension which is at least 80 times that of the graphite particles.

However, when an organic binder is used, such characteristic properties of graphite as outstanding resistances to heat and chemicals are not fully exhibited, while when no binder is used for the purpose of producing a flexible graphite material, the cohesion is not large enough for developing sufficient strength and flexibility unless the expanded graphite particles have a c direction dimension which is at least 80 times that of the graphite particles. In order to expand graphite particles to a c direction dimension of at least 80 times that of the graphite particles, it is necessary to heat at a high temperature of at least 1000° C., thus presenting problems of safety, limited selection in furnace materials, deterioration in performance due to oxidation of the graphite, and complication in the equipment construction. Moreover, although graphite itself is heat-resistant, the fabricated product becomes deteriorated in performance under an oxidizing atmosphere at temperatures exceeding 500° C. owing to the weight loss caused by oxidation. Thus, the graphite materials of the above-noted patents have found only limited uses.

An object of the present invention is to provide a graphite material which has none of the afore-mentioned disadvantages and is excellent in heat resistance, cold resistance, resistance to chemicals, low liquid and gas permeability, and to provide also a method for manufacturing such a graphite material.

According to this invention, there are provided a method for manufacturing a graphite material having compressibility and recovering property, which comprises treating graphite particles with an acid, washing the acid-treated graphite particles with water or an aqueous medium, treating the washed graphite particles with an aqueous solution of a phosphoric acid or a salt thereof, expanding the thus treated graphite particles by heating to 20 to 70 times (in terms of bulk density ratio) the original graphite particles, and molding the expanded graphite particles under application of pressure, as well as a graphite material manufactured by this method.

According to the present invention, because of the treatment of graphite particles with an aqueous solution of a phosphoric acid or a salt thereof, it becomes possible with a low expansion ratio to obtain a graphite material excellent in compressibility and recovering property, resistance to oxidation, mechanical strengths, easiness of handling, compatibility with another material, and low liquid and gas permeability.

The types of the graphite particles used in this invention are generally known natural graphite, Kish graphite, and artificial graphite such as pyrolytic graphite. Of these flake natural graphite such as, for example, flake graphite or vein graphite is preferred in view of availability. For improved efficiency in water-rinsing, expansion treatment, and subsequent molding operation, suitable particle size is 80 mesh or larger, preferably 50 mesh or larger and suitable form is thick needles.

Acid treatment of graphite particles is carried out, for example, by immersion in a strongly oxidizing solution such as, for example, fuming sulfuric acid, concentrated sulfuric acid, nitric acid, fuming nitric acid, concentrated nitric acid, a mixture of concentrated sulfuric acid and concentrated nitric acid, a mixture of concentrated sulfuric acid and nitric acid, an aqueous potassium chlorate solution, a mixture of concentrated nitric acid and potassium chlorate, an aqueous potassium permanganate solution, an aqueous potassium chromate solution, an aqueous potassium dichromate solution, phosphoric acid, a mixture of phosphoric acid and dichromic acid, or a mixture of sulfuric acid and potassium dichromate, at room temperature (10° C.) to 200° C., preferably 10° to 100° C., for 10 minutes to 20 hours, preferably 2 to 15 hours.

Washing is carried out by use of water or an aqueous medium until pH becomes 1 to 7, preferably 4 to 7 for operational convenience.

In the present invention, examples of aqueous solutions of phosphoric acids to be used are aqueous solutions of orthophosphoric acid ($H_3PO_4$), metaphosphoric acid ($HPO_3$), pyrophosphoric acid ($H_4P_2O_7$), and phosphoric anhydride ($P_2O_5$); examples of aqueous solutions of phosphoric acid salts to be used are aqueous solutions of aluminum dihydrogen phosphate [$Al(H_2PO_4)_3$], disodium hydrogenphosphate ($Na_2HPO_4$), potassium dihydrogenphosphate ($KH_2PO_4$), and ammonium dihydrogenphosphate ($NH_4H_2PO_4$).

The treatment with an aqueous solution of phosphoric acid or a salt thereof is carried out by immersing acid-treated and washed, graphite particles in said aqueous solution of a concentration of 0.05 to 1.0 mole per liter, for 0.5 to 10 hours. Such a treatment with an aqueous solution of a phosphoric acid or a salt thereof prior to the thermal expansion step permits of easy and uniform treatment operation and prevention of deterioration due to oxidation in the expansion step, thus leading to improvements in mechanical strengths and resistance to oxidation of the final product.

Aluminum dihydrogen phosphate [$Al(H_2PO_4)_3$] is an inorganic binder of distinguished heat resistance and refractoriness and is used as a binder in refractories, ceramics, and casting molds. It is a water-soluble acid phosphate and develops the hardening and bonding function by the reaction with the other substance to be hardened and bonded, by crystallizing out due to dehydration on heating, and by crystal transition upon heating at higher temperatures. The mechanism of bonding due to dehydration on heating is as follows:

(1) $2Al(H_2PO_4)_3 \rightarrow Al_2O_3.3P_2O_5.3H_2O$ (at 255° C.)
(2) $Al_2O_3.3P_2O_5.3H_2O \rightarrow Al_2O_3.3P_2O_5$ (at 450° C.)

The bonding proceeds further by crystal transition.

The expansion by heating in the present invention is carried out preferably at 600° to 800° C. for 1 to 3 minutes. Heating of the graphite particles is effected in a furnace heated electrically or heated by propane flame or the like. The reason for selecting an expansion ratio of 20 to 70 in terms of bulk density ratio relative to the graphite particles used as starting material is that the expanded graphite having an expansion ratio in said range gives an end product excellent in compressibility and recovering property, mechanical strengths, easiness of handling, compatibility with another material, and low liquid and gas permeability and that the expansion operation will present none of the difficulties encountered in the conventional expansion procedure operated at higher temperatures.

The bulk density ratio, as herein referred to, is determined in the following manner: 1,000 cc of the expanded graphite particles are measured out by means of a measuring cylinder while applying a gentle shaking to the cylinder and is weighed (W grams). Bulk density is $W/1,000$ g/cm$^3$. Although the void of the original unexpanded graphite particles is 50 to 70%, the void of the expanded granules is 30 to 50%. Accordingly, it was assumed for the original unexpanded graphite particles that the void is 30% and, hence, the bulk density is 1.57. Therefore, the bulk density ratio is $1.57 \times 1000/W$.

The pressure molding, e.g. compression molding, in the present invention can be carried out at an applied pressure of 30 to 500 kg/cm$^2$, but an applied pressure of 50 to 300 kg/cm$^2$ is preferable in view of compressibility and recovering property, mechanical strengths, easiness of handling, compatibility with another material and low liquid and gas permeability of the end product. The pressure molding time can be 1 second or more, but in order to attain the characteristics sufficient for a gasket material, a preferable molding time is 10 to 120 seconds including 1 to 5 times of degassing.

The present graphite material having compressibility and recovering property has a density of preferably 0.8 to 1.7 g/cm$^3$. If the density is below 0.8 g/cm$^3$, mechanical strengths are inferior, handling becomes difficult, and the oxidation rate is increased, whereas if the density exceeds 1.7 g/cm$^3$, the graphite material becomes too stiff to exhibit sufficient characteristics for gaskets and packings. The graphite material having a density of 0.8 to 1.7 g/cm$^3$ may be obtained by pressure molding the expanded graphite particles, for example, at an applied pressure of 50 to 300 kg/cm$^2$ for 10 to 120 seconds.

The present graphite material contains none of the organic binders such as phenolic resin and cellulose acetate.

A preferred embodiment is given below.

Graphite particles are immersed in an acid and the acid-treated particles are washed with water until pH becomes 4 to 7. The resulting wet graphite particles are immersed for 0.5 to 10 hours in an aqueous solution containing 0.05 to 1.0 mole/liter of a phosphoric acid or a salt thereof, preferably aluminum primary phosphate. After having been adjusted to a water content of 10 to 50%, the wet graphite particles are subjected to expansion treatment in the air at 600° to 800° C. under atmospheric pressure to obtain graphite particles expanded to an expansion ratio of 20 to 70 in terms of bulk density ratio relative to the graphite particles used as starting material. The resulting expanded graphite particles are molded, by application of pressure, for example, by compression molding, into a prescribed form of graphite alone or with a metallic core, so that the density of the graphite portion may become 0.8 to 1.7 g/cm$^3$. There is thus obtained a graphite product having compressibility and recovering property excellent in heat resistance, cold resistance, resistance to chemicals, compatibility with another material and low liquid and gas permeability. As compared with a graphite product manufactured from graphite particles not treated with an aqueous solution of a phosphoric acid or a salt thereof, the graphite product obtained above is superior in compressibility and recovering property, mechanical strengths, withstands higher pressure, and more resistant to oxidation under an oxidizing atmosphere at high temperatures, the last-named property being the most important advantage of the present graphite material. Alternatively, a graphite product in prescribed form may be fabricated by machining such as punching from a graphite sheet material manufactured by pressure-molding of the above expanded graphite particles. It is also feasible to obtain an end product in prescribed form by the integral pressure-molding of the expanded graphite particles together with a suitable reinforcement such as a metallic core.

The invention is further illustrated below with reference to Examples in which all percents are expressed by weight unless otherwise indicated.

EXAMPLE 1

In a mixture of 300 g of concentrated sulfuric acid (95%) and 100 g of nitric acid (60 to 62%) at room temperature, was immersed for 15 hours 100 g of natural Ceylon graphite in needle form (97% fixed carbon, 1% ash, 2% volatile matter, peak at 35 mesh in particle size distribution). The graphite particles were then washed with water until pH became 6, and filtered with suction until the water content became 25 to 35%. Thereafter, the wet graphite particles were immersed for 1 hour in 300 cc of an aqueous solution containing 0.5 mole/liter of orthophosphoric acid ($H_3PO_4$). Then the graphite particles were again suction-filtered to adjust the water content to 33%. The thus treated graphite particles were subjected to heat treatment in a furnace at 800° C. under an oxidizing atmosphere for about 3 minutes to obtain graphite particles expanded to 35 times (in terms of bulk density ratio) the original graphite particles. The expanded graphite particles were formed into sheets, 0.2 to 2.0 mm in thickness, by compression molding under an applied pressure of 100 or 250 kg/cm². In Table 1, are shown performance characteristics of the packings fabricated from the above graphite sheets by punching. For comparison, there are also shown in the same table characteristics of the packings fabricated in the same manner as described above, except that the original graphite particles were not treated with orthophosphoric acid prior to expansion.

Table 1

| Material Sp. gravity | Example (present invention) | | | Comparative Example | | |
|---|---|---|---|---|---|---|
| | Weight loss on heating (%) | | Compressive strength at falure (kg/cm²) | Weight loss on heating (%) | | Compressive strength at failure (kg/cm²) |
| | 600°C., 1 hour | 800°C., 1 hour | | 600°C., 1 hour | 800°C., 1 hour | |
| 1.2 | — | 6.0 | 800 | — | 25.5 | 730 |
| 1.7 | 0.5 | 5.0 | 680 | 1.0 | 19.5 | 590 |

In Table 1, the weight loss on heating (%) is the weight loss in percent based on the initial weight of a test specimen, 25 × 25 × 1.6 mm, when said test specimen is heated at a given temperature for a given period of time. The compressive strength at failure was determined by measuring the compressive load sustained at the moment of failure of a test specimen, 10 × 10 × 1.0 mm, by means of an Instron-type tester. The same shall apply hereinafter.

EXAMPLE 2

In a mixture of 400 g of concentrated sulfuric acid (95%) and 200 g of nitric acid (60-62%) at room temperature, was immersed for 2 hours 150 g of natural Soviet Russian graphite (98.5% fixed carbon, 0.7% ash, 0.8% volatile matter, peak at 50 mesh in particle size distribution). The graphite particles were washed with water until pH became 5, and filtered under suction to obtain wet graphite particles of a water content of 28%. The wet graphite particles were then immersed for 5 hours in an aqueous solution containing 0.1 mole/liter of orthophosphoric acid ($H_3PO_4$). The thus treated graphite particles of a water content of 30% was subjected to heat treatment at 800° C. to obtain graphite particles expanded to 60 times (in terms of bulk density ratio) the original graphite particles. The expanded graphite particles were formed into graphite sheets by compression molding under application of a pressure of 100 or 250 kg/cm². The performance characteristics of the packings fabricated from the above graphite sheets by punching were as shown in Table 2.

Table 2

| Material Specific gravity | Weight loss on heating (%) | | Compressive strength at failure (kg/cm²) |
|---|---|---|---|
| | 600°C., 1 hour | 800°C., 1 hour | |
| 1.2 | — | 4.5 | 780 |
| 1.7 | 0.4 | 3.5 | 640 |

EXAMPLE 3

The wet graphite particles obtained in Example 2 were immersed in an aqueous solution containing 0.1 mole/liter of pyrophosphoric acid ($H_4P_2O_7$) for 5 hours, and then subjected to heat treatment at 800° C. to obtain graphite particles expanded to 55 times (in terms of bulk density ratio). The expanded graphite particles were compression-molded under an applied pressure of 200 kg/cm² into a sheet having a density of 1.5 g/cm³. The weight loss on heating of a packing fabricated from the above graphite sheet by punching was about 1/5 of that of a packing fabricated from graphite particles not treated with an aqueous pyrophosphoric acid solution prior to expansion.

EXAMPLE 4

In a mixture of 400 g of concentrated sulfuric acid (95%) and 200 g of nitric acid (60-62%) at room temperature, was immersed 150 g of natural flake graphite (98.5% fixed carbon, 0.7% ash, 0.8% volatile matter, peak at 50 mesh in particle size distribution) for 2 hours. The graphite particles were then washed with water until pH became 5 and filtered under suction to obtain wet graphite particles of a water content of 32%. The wet graphite particles were immersed for 60 minutes in 400 cc of an aqueous solution containing 4% of aluminum dihydrogen phosphate to obtain aluminum dihydrogen phosphate-treated wet graphite particles having a water and aluminum dihydrogen phosphate content of 35%. These wet graphite particles were subjected to heat expansion treatment at 700° C. for 3 minutes to obtain graphite particles expanded to 58 times (in terms of bulk density ratio). The expanded graphite particles were formed into a graphite material in sheet form having a thickness of 1.6 mm and a density of 1.4 g/cm³ by compression molding and a graphite composite material by compression molding. The latter graphite composite material was composed of a metallic core clad on both sides with graphite layers, each 0.7 mm in thickness and 1.4 g/cm³ in density, said metallic core being a sheet steel, 0.2 mm in thickness, provided with holes of 1.0 mm in diameter punched through and turned over at intervals of 2.5 mm, the punching through being made in regular pattern on alternate sides of the metal sheet to offer raised portions of the punched through material alternately on either sides of the said sheet. The performance characteristics of both graphite materials were as shown in Table 3. In Table 3, are also shown performance characteristics of the graphite materials manufactured by a conventional method in which the treatment with aluminum dihydrogen phosphate was excluded as shown in the following Comparative Examples.

Comparative Example 1

In a mixture of 400 g of concentrated sulfuric acid (95%) and 200 g of nitric acid (62%), was immersed 150 g of the same graphite particles as used in Example 4, at room temperature for 2 hours. The graphite particles were then washed thoroughly with water to obtain wet graphite particles. Half of the wet graphite particles was subjected to expansion treatment in a furnace at 1,200° C. for 1 minute to obtain graphite particles expanded to 138 times in terms of bulk density ratio. The expanded graphite particles were formed into a graphite material by compression molding, as in Example 4.

Comparative Example 2

The remainder of the wet graphite particles obtained in Comparative Example 1 was treated at 700° C. for 3 minutes, as in Example 4, to obtain graphite particles expanded to 52 times in terms of bulk density ratio. A graphite material was obtained by the compression molding as in Example 4.

Table 3

| | | | | Example 4 | Comparative Example 1 | Comparative Example 2 |
|---|---|---|---|---|---|---|
| Compressive characteristics* | Compressibility (%) | Before aging | Metallic core | 18.0 | 17.8 | 17.0 |
| | | Aged at 800° C. for 30 min. | | 19.1 | 22.7 | 23.1 |
| | Recovery (%) | Before aging | Metallic core | 35.0 | 33.6 | 27.3 |
| | | Aged at 800° C. for 30 min. | | 34.4 | 21.8 | 19.7 |
| Compressive strength at failure (kg/cm²) | | Before aging | Without metallic core | 820 | 634 | 492 |
| | | Aged at 800° C. for 30 min. | | 780 | 394 | 290 |
| Weight loss on heating (%) | | 600° C., 1 hour | Metallic core | 0 | 0.32 | 0.45 |
| | | 800° C., 1 hour | | 0.85 | 19.6 | 18.3 |
| Leak Test** (kg/cm²) | | Before aging | Metallic core | 18 | 18 | 22 |
| | | Aged at 800° C. for 30 min. | | 18 | 24 | 24 |

Note:
*Compressive characteristics: Measured on a test specimen, 25 × 25 × 1.6 mm, by means of an Instron-type tester. Diameter of penetrator, 22.6 mm; preload, 7 kg/cm²; major load 350 kg/cm².

$$\text{Compressibility (\%)} = \frac{T_0 - T_1}{T_0} \times 100$$

$$\text{Recovery (\%)} = \frac{T_2 - T_1}{T_0 - T_1} \times 100$$

where:
$T_0$ = thickness under preload,
$T_1$ = thickness under preload plus major load,
$T_2$ = thickness under original preload after removal of the major load.
**Leak test: Minimum clamping pressure to prevent the oil at 80° C and 10 kg/cm² from leakage was measured, using a test specimen, 35 mm in outer diameter, 25 mm in inner diameter, 1.6 mm in thickness.

EXAMPLE 5

Wet graphite particles obtained in the same manner as in Example 4 were immersed in an aqueous solution containing 20% of aluminum dihydrogen phosphate for 120 minutes. The thus treated graphite particles having a water and aluminum dihydrogen phosphate content of 37% were subjected to expansion treatment by heating at 600° C. for 3 minutes to obtain graphite particles expanded to 46 times (in terms of bulk density ratio) the original graphite particles. In the same manner as in Example 4, the expanded graphite particles were formed by compression molding into graphite composite materials which had performance characteristics as shown in Table 4.

For comparison, wet graphite particles were prepared in the same manner as in Comparative Example 1 and expanded in 41 times by heating in a furnace at 600° C. for 3 minutes. The expanded particles were compression molded into a graphite material having the characteristics as shown in Table 4 (Comparative Example 3).

EXAMPLE 6

Wet graphite particles obtained in the same manner as in Example 4 were immersed in an aqueous solution containing 10% of aluminum dihydrogen phosphate for 90 minutes to obtain graphite particles having a water and aluminum dihydrogen phosphate content of 37%. The resulting aluminum dihydrogen phosphate-treated wet graphite particles were subjected to expansion treatment by heating at 800° C. for 3 minutes. The resulting graphite particles expanded to 68 times (in terms of bulk density ratio) the original graphite particles were molded into a graphite composite material in the same manner as in Example 4. The performance characteristics of this material were as shown in Table 5. For comparison, wet graphite particles were prepared in the same manner as in Comparative Example 1 and expanded to 65 times (in terms of bulk density ratio) by heating in a furnace at 800° C. for 3 minutes. The expanded particles were molded into a graphite material having the characteristics as shown in Table 5 (Comparative Example 4).

Table 4

| | | | | Example 5 | Comparative Example 3 |
|---|---|---|---|---|---|
| Compressive characteristics | Compressibility (%) | Before aging | Metallic core | 17.0 | 16.2 |
| | | Aged at 800° C. for 30 min. | | 18.2 | 23.0 |
| | Recovery (%) | Before aging | Metallic core | 34.3 | 21.9 |
| | | Aged at 800° C. for 30 min. | | 34.0 | 15.7 |
| Compressive strength at failure (kg/cm²) | | Before aging | Without metallic core | 790 | 417 |
| | | Aged at 800° C. for 30 min. | | 772 | 241 |
| Weight loss on heating (%) | | 600° C., 1 hr. | Metallic core | 0 | 0.63 |
| | | 800° C., 1 hr. | | 0.95 | 18.7 |
| Leak test (kg/cm²) | | Before aging | Metallic core | 18 | >30 |
| | | Aged at 800° C. for 30 min. | | 18 | — |

Table 5

| Compressive characteristics | | | | Example 6 | Comparative Example 4 |
|---|---|---|---|---|---|
| | Compressibility (%) | Before aging | Metallic core | 18.3 | 17.3 |
| | | Aged at 800° C. for 30 min. | | 19.4 | 21.9 |
| | Recovery (%) | Before aging | Metallic core | 34.1 | 28.5 |
| | | Aged at 800° C. for 30 min. | | 32.9 | 20.5 |
| Compressive strength at failure (kg/cm²) | | Before aging | Without metallic core | 845 | 520 |
| | | Aged at 800° C. for 30 min. | | 790 | 307 |
| Weight loss on heating (%) | | 600° C., 1 hr. | Metallic core | 0 | 0.35 |
| | | 800° C., 1 hr. | | 0.92 | 18.8 |
| Leak test (kg/cm²) | | Before aging | Metallic core | 18 | 20 |
| | | Aged at 800° C. for 30 min. | | 18 | 24 |

EXAMPLE 7

Expanded graphite particles obtained in the same manner as in Example 4 were compression molded, under an applied pressure of 200 kg/cm², into a graphite material in sheet form having a thickness of 1.6 mm and a density of 1.4 g/cm³ and a graphite composite material composed of the same metallic core as used in Example 4, clad on both sides with graphite layers, each 0.7 mm in thickness and 1.4 g/cm³ in density. Both graphite materials were compared for resistance to oxidation and mechanical strengths with other graphite materials containing antioxidation agents. The latter graphite materials were prepared by incorporating 2, 10, or 55% of $AlPO_4$, $B_2O_3$, $Al_2O_3$, $NaH_2PO_4$, $CaHPO_4$, or $K_2HPO_4$ into the expanded graphite particles obtained in Comparative Example 1, and compression molding the resulting mixture into a graphite material in sheet form or graphite composite material in the same manner as mentioned above. The results of tests for weight loss on heating and compressive strength at failure were as shown in Table 6.

Table 6

| Sample | Item of test | Weight loss on heating (%) | Compressive strength at failure (kg/cm²) |
|---|---|---|---|
| Example 7 | | 0.85 | 820 |
| $AlPO_4$ | 2% | 5.5 | 750 |
| | 10% | 8.7 | 690 |
| | 55% | 14.3 | 180 |
| $B_2O_3$ | 2% | 3.0 | 725 |
| | 10% | 2.3 | 710 |
| $Al_2O_3$ | 2% | 6.4 | 690 |
| | 10% | 7.3 | 730 |
| $NaH_2PO_4$ | 2% | 6.6 | 630 |
| | 10% | 6.9 | 680 |
| $CaHPO_4$ | 2% | 6.4 | 705 |
| | 10% | 8.0 | 705 |
| $K_2HPO_4$ | 2% | 8.9 | 805 |
| | 10% | 10.6 | 630 |

From the results shown in Table 6, it is seen that the graphite material manufactured from the expanded graphite particles having been treated with aluminum dihydrogen phosphate solution prior to expansion shows a distinctly improved weight loss on heating and compressive strength at failure, as compared with those manufactured from the expanded graphite particles admixed, after expansion, with other powdered phosphates and oxides.

According to the present invention, since the graphite particles are treated with an aqueous solution of a phosphoric acid or a salt thereof prior to expansion, the treatment can be uniformly carried out and the deterioration of graphite particles in the course of expansion may be avoided. Moreover, according to this invention, even though the expansion ratio is relatively small, sufficient bonding of the graphite particles may be achieved, resulting in simplification of the manufacturing equipments; operation safety is secured because high temperatures exceeding 1000° C. are unnecessary in expansion treatment; easiness of handling of the expanded graphite particles is improved because of relatively low bulk density. Owing to the treatment with an aqueous solution of a phosphoric acid or a salt thereof, the present graphite material shows only low oxidation even if used under an oxidizing atmosphere at a temperature exceeding 500° C., indicating that the material may be a general-purpose material. The material also shows improvements in physical properties such as mechanical strengths, easiness of handling, compatibility with another material, low liquid and gas permeability, etc. Particularly when the graphite particles are treated with an aqueous solution of aluminum dihydrogen phosphate, there is obtained a graphite material which is excellent in resistance to oxidation, shows only a very small weight loss due to oxidation under an oxidizing atmosphere at a temperature higher than 500° C., and is improved in cohesion and mechanical strengths.

What is claimed is:

1. A method for manufacturing a graphite material having compressibility and a recovering property, which comprises treating particles consisting of graphite with an acid, washing the acid-treated graphite particles with water or an aqueous medium, treating the washed graphite particles with a binder consisting essentially of an aqueous solution of aluminum dihydrogen phosphate, expanding the thus treated graphite particles to 20 to 70 times, in terms of bulk density ratio, the original graphite particles by heating, and molding the expanded graphite particles under the application of pressure.

2. A method according to claim 1, wherein the molding is carried out under application of a pressure of 50 to 300 kg/cm².

3. A method according to claim 2, wherein the molding is carried out for 10 to 120 seconds.

4. A method according to claim 2, wherein the aqueous solution of aluminum dihydrogen phosphate has a concentration of 0.05 to 1.0 mole per liter.

5. A method according to claim 4, wherein the expansion by heating is carried out at a temperature of 600° to 800° C. for 1 to 3 minutes.

6. A method according to claim 1, wherein the density of the graphite material having compressibility and recovering property is 0.8 to 1.7 g/cm$^3$.

7. A graphite material manufactured by the method according to claim 1.

8. A graphite material manufactured by the method according to claim 2.

9. A graphite material manufactured by the method according to claim 3.

10. A graphite material manufactured by the method according to claim 4.

11. A graphite material manufactured by the method according to claim 5.

12. A graphite material manufactured by the method according to claim 6.

* * * * *